US006202969B1

(12) United States Patent
Orr

(10) Patent No.: US 6,202,969 B1
(45) Date of Patent: Mar. 20, 2001

(54) DUCT HANGER DEVICE

(76) Inventor: Patrick C. Orr, 616 Second Ave. NW., Cascade, IA (US) 52033

( * ) Notice: Subject to any disclaimer, the term of this patent is extended or adjusted under 35 U.S.C. 154(b) by 0 days.

(21) Appl. No.: 09/414,931

(22) Filed: Oct. 12, 1999

Related U.S. Application Data

(60) Provisional application No. 60/106,896, filed on Nov. 3, 1998.

(51) Int. Cl.[7] ....................................................... A47F 5/00
(52) U.S. Cl. ........................................... 248/301; 248/317
(58) Field of Search ................................... 248/300, 317, 248/200, 301

(56) References Cited

U.S. PATENT DOCUMENTS

| D. 405,348 | 2/1999 | Orr . | |
|---|---|---|---|
| 1,865,134 | * 6/1932 | Plimpton | 248/200 |
| 2,889,145 | 6/1959 | Hoffman . | |
| 3,017,174 | 1/1962 | Reuter . | |
| 3,263,388 | 8/1966 | Bogert . | |
| 3,734,436 | 5/1973 | Liberman . | |
| 3,837,609 | * 9/1974 | Weiss et al. | 248/317 |
| 3,863,879 | 2/1975 | Herb . | |
| 3,960,350 | 6/1976 | Tardoskegyi . | |
| 4,077,592 | 3/1978 | Forbes . | |
| 4,787,592 | 11/1988 | Aoshika . | |
| 5,307,860 | * 5/1994 | Wilkinson et al. | 248/300 X |
| 5,350,141 | 9/1994 | Perrault et al. . | |
| 5,947,431 | * 9/1999 | Kiggins | 248/200 |

* cited by examiner

Primary Examiner—Ramon O. Ramirez
(74) Attorney, Agent, or Firm—Tipton L. Randall

(57) ABSTRACT

A duct hanging bracket device that easily fastens to both an air handling duct and a support structure is disclosed. The device includes an elongated linear segment with opposing parallel legs at each end. The legs each have an aperture, one for fastening to the duct and the other for fastening to the support surface. A stop member is spaced from one leg, such that the duct fits between the leg and the stop member, allowing for easy fastening of the duct to the leg.

15 Claims, 8 Drawing Sheets

DUCT HANGER DEVICE

CROSS-REFERENCE TO RELATED APPLICATIONS, IF ANY

This application claims the benefit under 35 U.S.C. §119(e) of now abandoned provisional application Ser. No. 60/106,896, filed Nov. 3, 1998. Application Ser. No. 60/106, 896 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for hanging an air handling duct, and more particularly, to a duct hanging bracket device that easily fastens to both the duct and support structure.

2. Background Information

Air handling ducts are commonly made from sheet metal and are used to transfer air to and from heating and cooling devices. The air handling ducts, commonly called heating, ventilation and air conditioning (HVAC) ducts, are generally positioned along the underside of floors or ceilings in residential and commercial structures. This position allows for enclosing the ducts for a more pleasing appearance. The ducts are hung from the overhead support structure, such as ceiling or floor joists, using some type of hanger device. Often the installer merely uses pieces of sheet metal to hang the duct from the joists. The fashioning of these hanging strips can be quite time consuming. Consequently, there is a need for a preformed duct hanging member that is easy to install and provides secure fastening of the duct work to the overhead support structure.

Some examples of inventions for hanging duct work have been granted patents. Hoffman, in U.S. Pat. No. 2,889,145, describes an adjustable hanger apparatus for supporting hot air ducts. Reuter, in U.S. Pat. No. 3,017,174, discloses an air duct jack used for installing duct work. Bogret, in U.S. Pat. No. 3,263,388, and Liberman in U.S. Pat. No. 3,734,436, disclose hangers for installing ceiling tile grid work. Herb, in U.S. Pat. No. 3,863,879, discloses a hanger device for mounting a ceiling air terminal A variety of hangers and supports for duct work and piping are shown in U.S. Pat. No. 3,960,350 by Tardoskegyi, in U.S. Pat. No. 4,077,592 by Forbes and in U.S. Pat. No. 5,350,141 by Perrault et al. In U.S. Pat. No. 4,787,592 Aoshika describes a device for hanging duct work or piping, including an anchor embedded in the ceiling of a building. None of these patents disclose or suggest the duct hanging bracket of the present invention.

SUMMARY OF THE INVENTION

The invention is a duct hanging bracket member for supporting a duct member. The bracket member comprises a generally planar elongated linear segment with first and second ends, having a first leg section positioned at the linear segment first end and disposed essentially perpendicular thereto, with an aperture centrally position there through. A second leg section is positioned at the linear segment second end and disposed essentially perpendicular thereto and in opposition to the first leg section. The second leg section has an aperture centrally positioned there through, as well. A stop means is secured to the linear segment first end and disposed essentially perpendicular thereto, and in opposition to the first leg section. The stop means is oriented parallel to the second leg section and in spaced apart relation therefrom. The stop means and the second leg section are spaced to accept a duct member there between. The bracket member is secured to a support surface with a fastener positioned in the first leg section aperture, and a duct member positioned adjacent the elongated linear section is supported and secured by the stop means and the second leg section with a fastener positioned in the second leg section aperture. Additional apertures in the elongated linear segment are provided for additional fasteners to secure the duct to the bracket member.

DESCRIPTION OF THE PREFERRED EMBODIMENTS

Nomenclature

Figure 1:
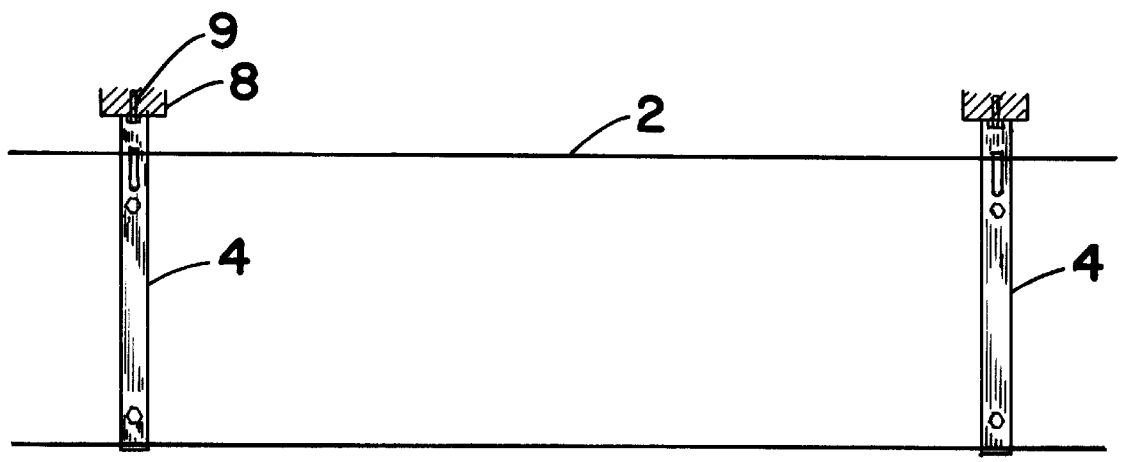
FIG. 1 is a front elevational view of an HVAC duct hung from overhead joists by the invention duct hanging brackets.
Figure 2:
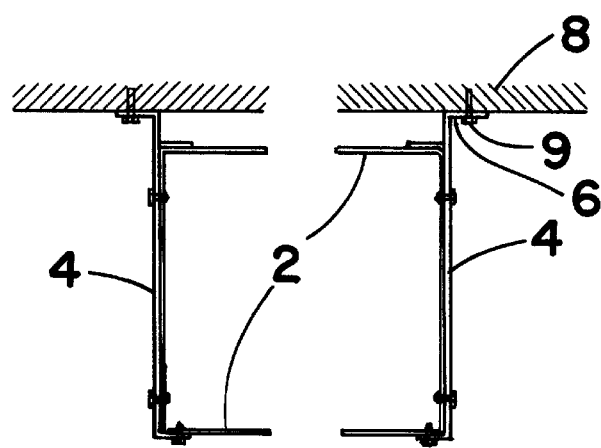
FIG. 2 is an end view of an HVAC duct hung from overhead members.

2 HVAC Duct
4 Duct Hanging Bracket Member
6 Upper End of Bracket Member
8 Joist
9 Fastener
10 Elongated Linear Segment of Bracket Member
12 First End of Bracket Member
13 Second End of Bracket Member
14 First Leg Section of Bracket Member
15 Aperture in First Leg Section
16 First Segment of First Leg Section
17 Aperture in Second Leg Section
18 Stop Member
19 Aperture in Elongated Linear Segment
21 Aperture in Elongated Linear Segment
22 Second Leg Section of Bracket Member
23 Slot in Elongated Linear Segment 104 Duct Hanging Bracket Member
110 Elongated Linear Segment of Bracket Member
112 First End of Bracket Member
113 Second End of Bracket Member
114 First Leg Section of Bracket Member
115 Aperture in First Leg Section
117 Aperture in Second Leg Section
118 L-Shaped Stop Member
119 Aperture in Elongated Linear Segment
120 Leg Section and Stop Assembly
121 Aperture in Elongated Linear Segment
122 Second Leg Section of Bracket Member
204 Duct Hanging Bracket Member
210 Elongated Linear Segment of Bracket Member
212 First End of Bracket Member
213 Second End of Bracket Member
214 First Leg Section of Bracket Member
215 Aperture in First Leg Section
217 Aperture in Second Leg Section
218 Aperture in Elongated Linear Segment
221 Aperture in Elongated Linear Segment
222 Second Leg Section of Bracket Member
304 Duct Hanging Bracket Member
310 Elongated Linear Segment of Bracket Member
312 First End of Bracket Member
313 Second End of Bracket Member
314 First Leg Section of Bracket Member
315 Aperture in First Leg Section
317 Aperture in Second Leg Section
318 V-Shaped Stop Member
319 Aperture in Elongated Linear Segment
320 Leg Section and Stop Assembly
321 Aperture in Elongated Linear Segment
322 Second Leg Section of Bracket Member
404 Duct Hanging Bracket Member
410 Elongated Linear Segment of Bracket Member
412 First End of Bracket Member
413 Second End of Bracket Member
414 First Leg Section of Bracket Member
415 Aperture in First Leg Section
417 Aperture in Second Leg Section
418 U-Shaped Stop Member
419 Aperture in Elongated Linear Segment
421 Leg Section and Stop Assembly
421 Aperture in Elongated Linear Segment
422 Second Leg Section of Bracket Member
504 Duct Hanging Bracket Member
510 Elongated Linear Segment of Bracket Member
512 First End of Bracket Member
513 Second End of Bracket Member
514 First Leg Section of Bracket Member
515 Aperture in First Leg Section
517 Aperture in Second Leg Section
518 Stop Member
519 Aperture in Elongated Linear Segment
520 Leg Section and Stop Assembly
521 Aperture in Elongated Linear Segment
522 Second Leg section of Bracket Member Construction FIGS. 1 and 2 illustrate a heating, ventilation and air conditioning (HVAC) duct 2 which is suspended by the preferred embodiment of the duct hanging bracket member 4. Each side of the HVAC duct 2 is provided with a duct hanging bracket member 4 which is fixed at its upper end 6 to the underside of a joist 8 by one or more fasteners 9, such as a screw or nail.

Figure 3:
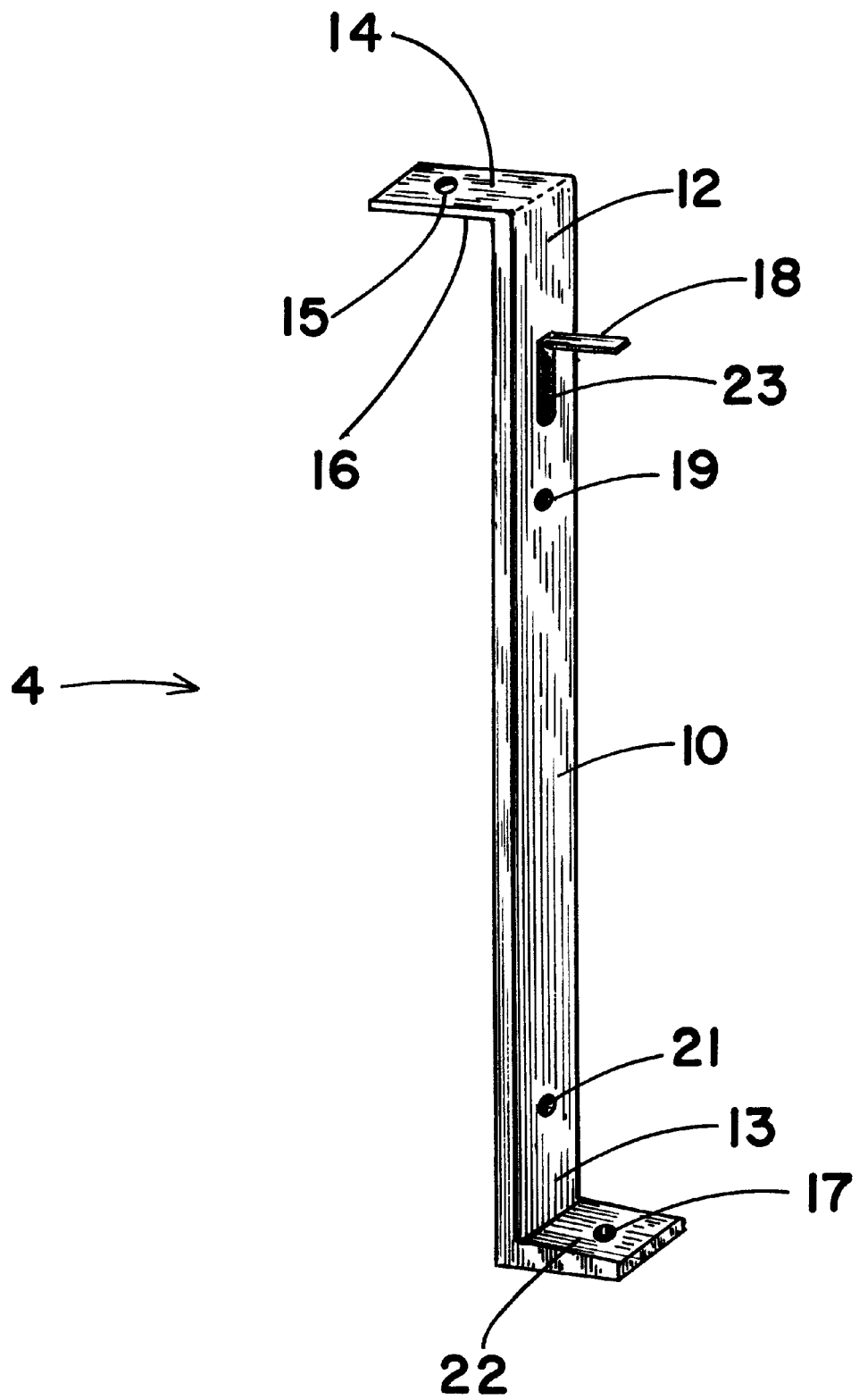
FIG. 3 is a perspective view of the preferred embodiment of the duct hanging bracket invention.
Figure 4:
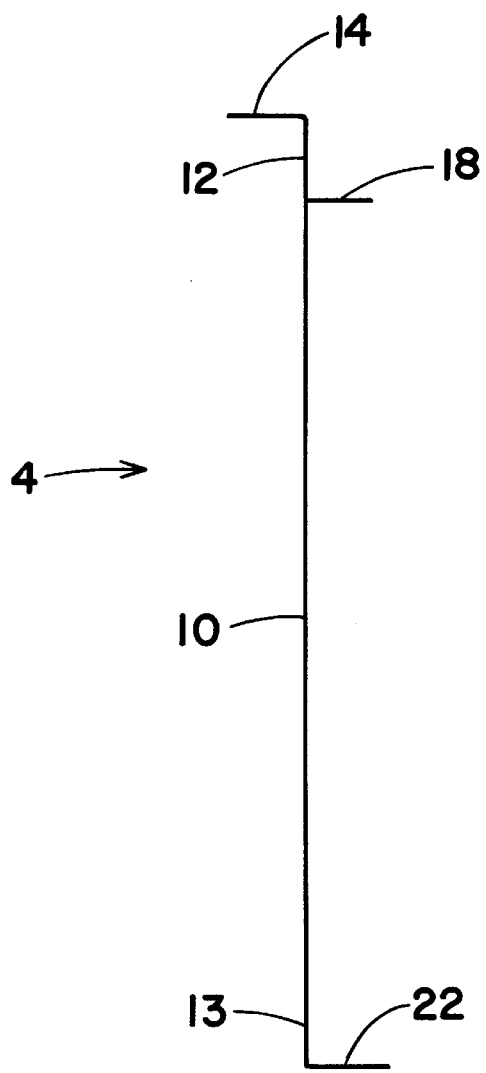
FIG. 4 is a front elevation of the preferred embodiment of the invention.
Figure 5:
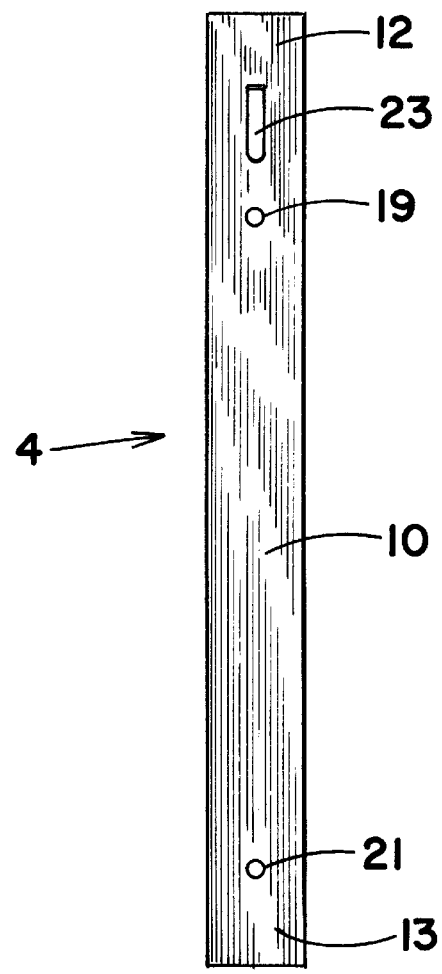
FIG. 5 is a side plan view of the preferred embodiment of the invention.

FIGS. 3, 4, and 5 illustrate the preferred embodiment of the duct hanging bracket member 4. The bracket member 4 includes an elongated linear segment 10 which is deployed in a substantially vertical orientation when the duct hanging bracket member 4 is employed to suspend an HVAC duct 2. The bracket member 4 has a first end 12 and a second end 13. At the first end 12 of the elongated linear segment 10 is formed a first leg section 14 which comprises a first segment 16 disposed at a substantial perpendicular from the axis of elongated linear segment 10. A first aperture 15 is provided centrally in the first leg section 14 for entry of a fastener 9, such as a screw, there through. The fastener 9 secures the bracket member first end 12 to a joist 8 or similar support surface.

The second end 13 of the elongated linear segment 10 opposes the first end 12 thereof and has affixed thereto a second leg section 22 which extends at a perpendicular from the second end 13 of elongated linear segment 10. The second leg section 22 is linear and extends in a direction from elongated linear segment 10 which opposes the direction of the first leg section 14 from the elongated linear segment 10. A second aperture 17 through the second leg section 22 is provided to permit another fastener, such as a sheet metal screw, to be passed through the aperture 17 and be affixed to a duct sidewall, thereby securing the bracket member second leg section 22 to the HVAC duct 2.

A stop member 18, such as a tab or a shelf, is mounted to elongated linear segment 10 to extend therefrom generally in parallel to the second leg section 22. The stop member 18 is spaced from the top of the bracket member second leg section 22 a distance substantially equal to the height of the HVAC duct 2 to be suspended by the duct hanging bracket member 4. In the preferred embodiment, the bracket member 4 is fabricated from sheet metal, and the stop member 18 is formed by punching it from the middle portion of elongated linear segment 10, although other means of mounting or forming the stop member 18 are contemplated, such as attachment by welding, adhesives or by fasteners. A slot 23 remains in the elongated linear section 10 after the stop member 18 is formed. The stop member 18 functions to abut the top of the HVAC duct 2 to be suspended by the duct hanging bracket member 4. The stop member 18 resists the upward displacement of the HVAC duct 2 when a fastener, such as a sheet metal screw, is driven into the bottom of the HVAC duct after passing through the preformed second aperture 17. Additionally, third and fourth apertures 19 and 21 are formed in the elongated leg section segment 10 between the stop member 18 and the second leg section 22 to provide openings for additional fasteners, such as sheet metal screws, to fasten the duct hanging bracket member 4 to the HVAC duct 2.

Figure 6:
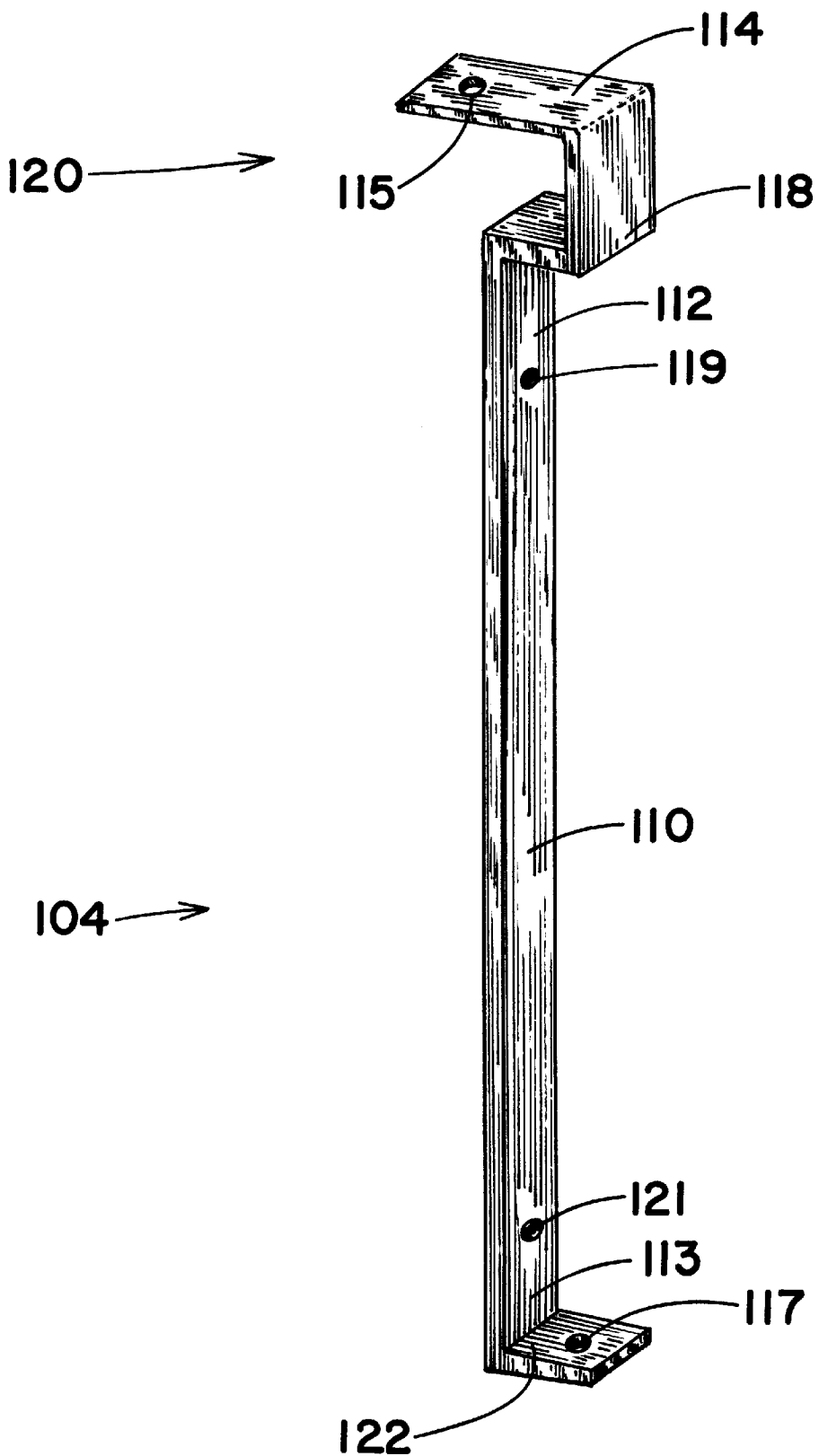
FIG. 6 is a perspective view of an alternate embodiment of the duct hanging bracket invention.

FIG. 6 discloses an alternate embodiment of the invention wherein the HVAC duct hanging bracket member 104 includes a planar, elongated vertical segment 110 having a first end 112 and a second end 113. A combined leg and stop assembly 120 is fastened to the first end 112 of the vertical segment 110. The leg and stop assembly 120 includes an L-shaped stop member 118 fastened perpendicularly at one end to the elongated segment first end 112, with a first leg section 114 fastened perpendicularly at the other end of the L-shaped stop member 118, with the first leg section 114 extending beyond the extended plane of the elongated vertical segment 110. A first aperture 115 is provided at one end of the first leg section 114 for entry of a fastener to secure the bracket member first end 112 to a joist or similar support surface.

A second leg section 122 extends at a perpendicular from the second end 113 of the elongated linear segment 110, and is essentially parallel to the leg of the L-shaped stop member 118 fastened to the linear segment first end 112. A second aperture 117 through the second leg section 122 is provided to permit another fastener, such as a sheet metal screw, to be passed through the aperture 117 and be affixed to a duct sidewall, thereby securing the bracket member second leg section 122 to the HVAC duct 2. Apertures 119 and 121 in the elongated linear segment 110 are provided for further mounting the duct hanging member 104 to the sidewall of a duct being hung, while the aperture 117 centrally located in the second leg section 122 provides an opening for a sheet metal screw to pass though and engage the lower wall of the duct to be hung. The stop member 118 provides a stop for the top of the duct to be hung to facilitate entry of a sheet metal screw into the bottom of the duct 2.

The distance between the bracket member second leg section 122 and the stop member 118 is substantially equal to the height of the HVAC duct 2 to be suspended by the duct hanging bracket member 104. Again, the bracket member 104 is preferably fabricated from sheet metal for strength, durability, and ease of manufacture.

Figure 7:
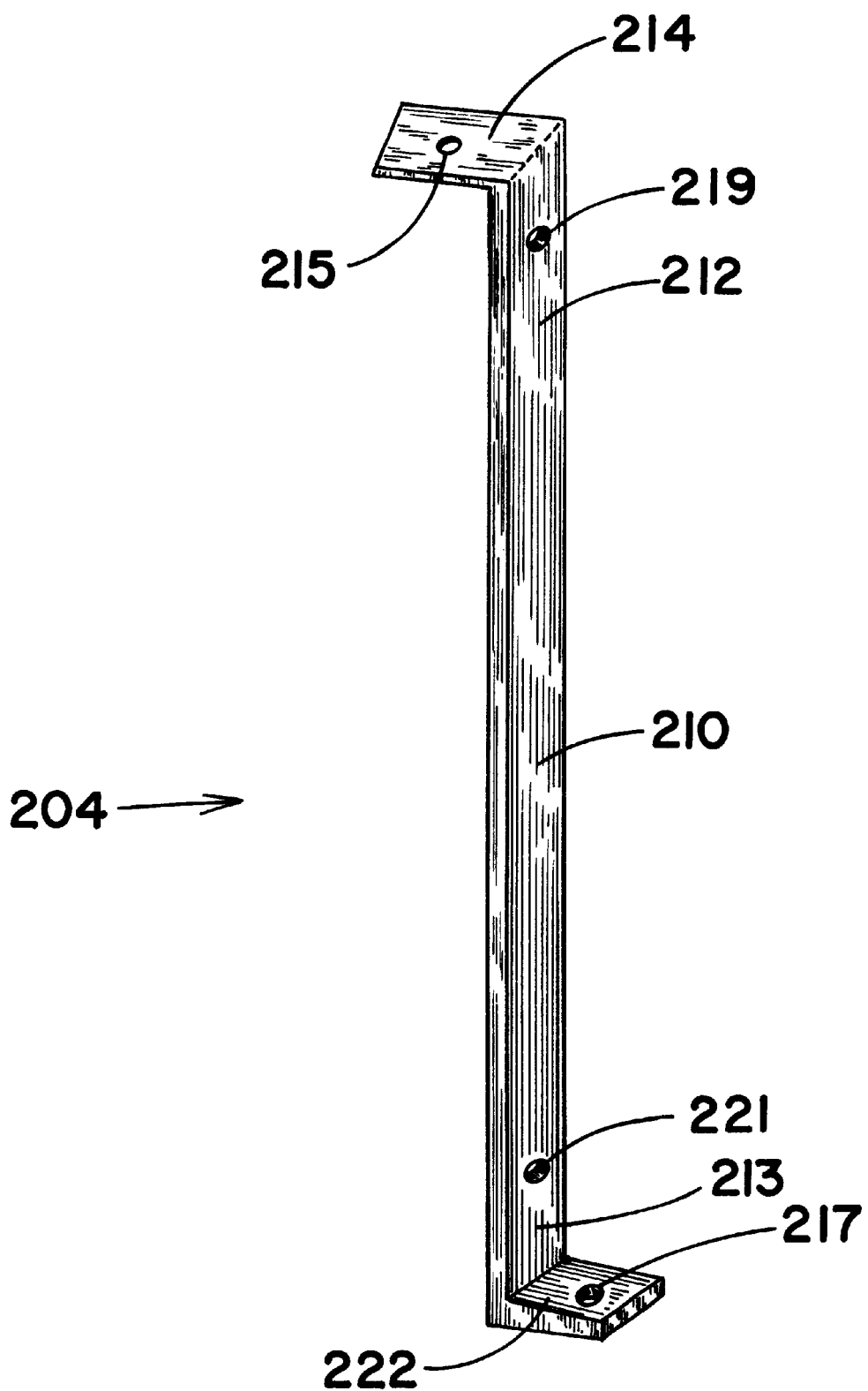
FIG. 7 is a perspective view of a simplified alternate embodiment of the invention.

FIG. 7 shows a simplified alternative embodiment of the duct hanging member 204 wherein an elongated vertical segment 210 is provided with a first leg section 114 at its first end 212 and a second leg section 222 at its second end 213. The first leg section 214 and second leg section 222 are each perpendicular to the elongated vertical segment 210 and extend therefrom in opposing directions. Each leg section 214, 222 has a centrally located aperture 215, 217, respectively, for securing the bracket member 204 to a support surface and the duct to be hung. Apertures 219 and 221 are provided for further mounting the duct hanging member 204 to the sidewall of a duct being hung, while the aperture 217, centrally located in the second leg section 222, provides an opening for a sheet metal screw to pass though and engage the lower wall of the duct to be hung. In this embodiment, the bracket member 204 is sized to hold the HVAC duct 2 tightly against the joist 8 or other support surface. Again, the bracket member 204 is preferably fabricated from sheet metal for strength, durability, and ease of manufacture.

Figure 8:
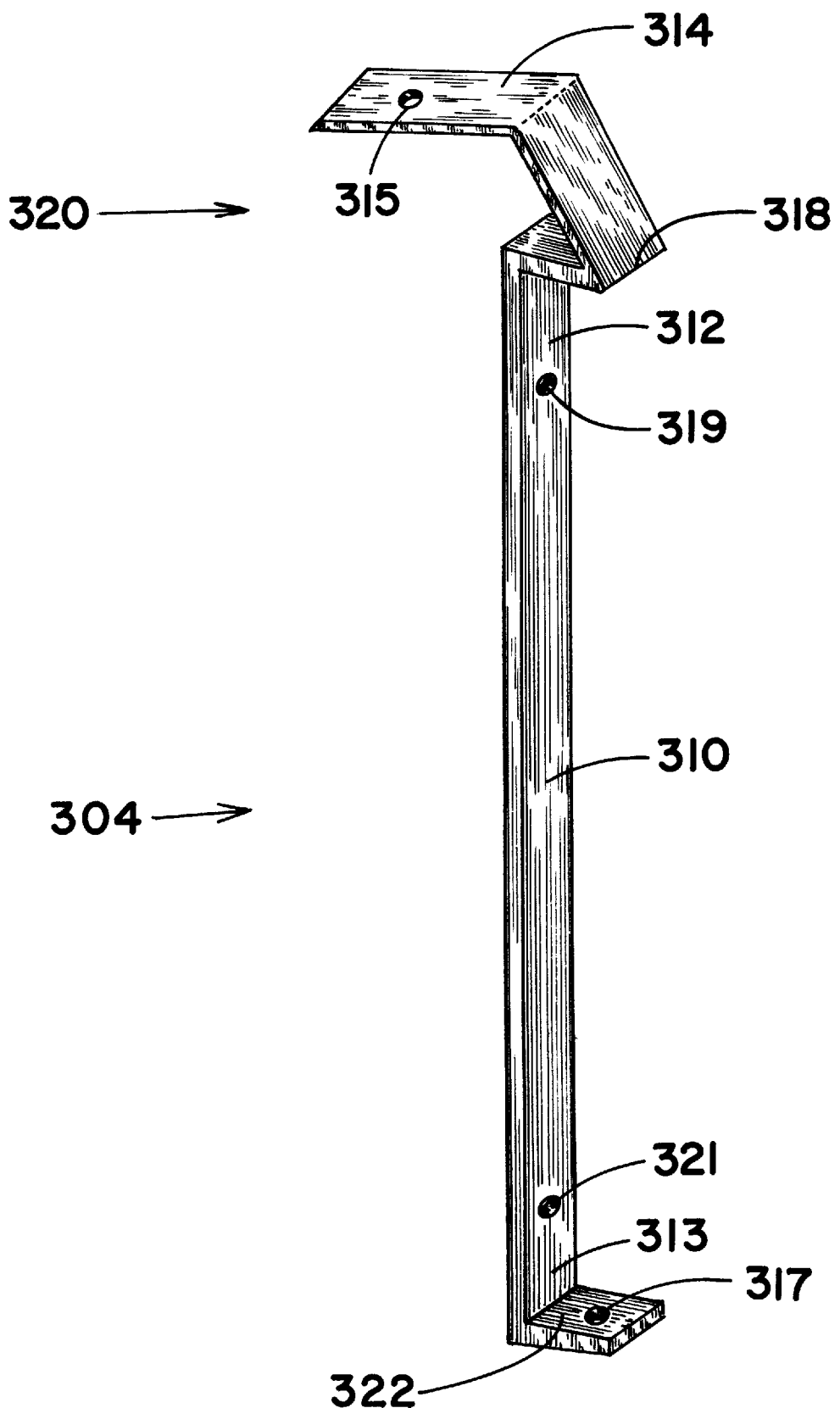
FIG. 8 is a perspective view of another alternate embodiment of the invention.

FIG. 8 discloses another alternate embodiment of the duct hanging member 304. The elongated vertical segment 310 is connected to the combined leg and stop assembly 320, similar to the assembly 120 described for FIG. 6. In this embodiment, the stop member 318 is V-shaped and composed of two sections joined at an acute angle. The first leg section 314 extends beyond the extended plane of the elongated vertical segment 310. A first aperture 315 is provided at one end of the first leg section 314 for entry of a fastener to secure the bracket member first end 312 to a joist or similar support surface.

A second leg section 322 extends at a perpendicular from the second end 313 of the elongated linear segment 310, and is essentially parallel to the leg of the V-shaped stop member 318 fastened to the linear segment first end 312. A second aperture 317 through the second leg section 322 is provided to permit another fastener, such as a sheet metal screw, to be passed through the aperture 317 and be affixed to a duct sidewall, thereby securing the bracket member second leg section 322 to the HVAC duct 2. Apertures 319 and 321 are provided for further mounting the duct hanging member 304 to the sidewall of a duct being hung, while the aperture 317 centrally located in the second leg section 322 provides an opening for a sheet metal screw to pass though and engage the lower wall of the duct to be hung. The stop member 318 provides a stop for the top of the duct to be hung to facilitate entry of a sheet metal screw into the bottom of the duct 2.

The distance between the bracket member second leg section 322 and the stop member 318 is substantially equal to the height of the HVAC duct 2 to be suspended by the duct hanging bracket member 304. Again, the bracket member 304 is preferably fabricated from sheet metal for strength, durability, and ease of manufacture.

Figure 9:
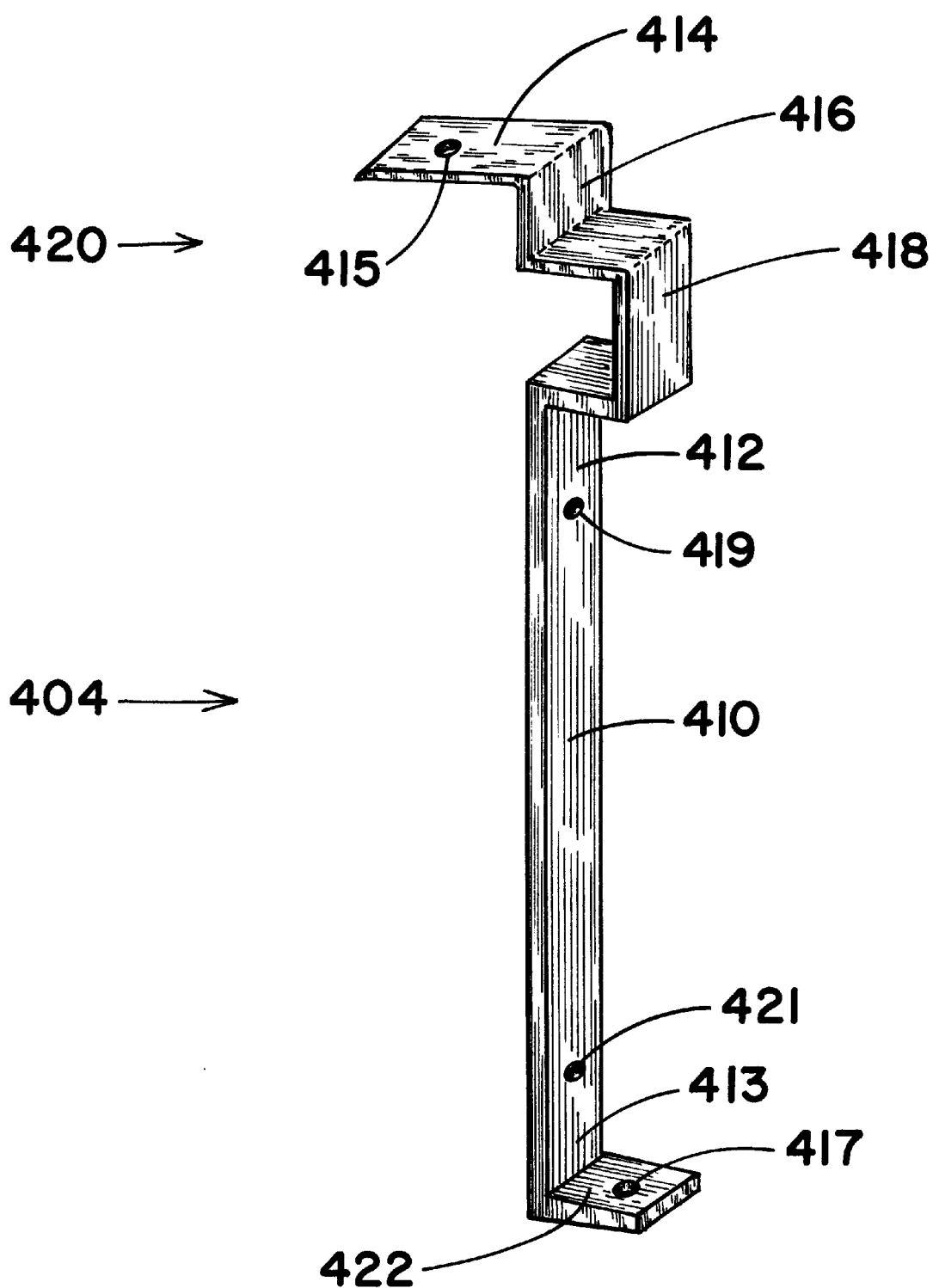
FIG. 9 is a perspective view of another alternate embodiment of the invention.

FIG. 9 illustrates another embodiment of the duct hanging member 404 invention. The duct hanging member 404 comprises an elongated linear segment 410 jointed to a second leg section 422 at the second end 413 thereof At the first end 412 of the elongated linear segment 410 is attached the leg and stop member assembly 420. The stop member 418 comprises a U-shaped member interposed between the linear segment first end 412 and the first segment 416 of the first leg section 414 attached thereto. The first and second leg sections 414, 422 are oriented perpendicular to the elongated linear segment 410 and in opposition to each other. The U-shaped stop member 418 is in spaced relationship from the second leg section 422 so as to accommodate a HVAC duct 2 there between. The first and second leg sections each have an aperture 415, 417, respectively. The first leg section aperture 415 is used to fasten the bracket member 404 to an overhead support surface, while the second leg section aperture 417 functions to fasten a HVAC duct 2 lower wall to the bracket member 404. Additional apertures 419,421 are provided in the elongated linear segment 410 for additional fasteners to secure the duct 2 to the bracket member 404. Again, the bracket member 404 is preferably fabricated from sheet metal for strength, durability, and ease of manufacture.

The duct hanging bracket members 104, 304, and 404 are preferably fabricated from sheet metal by stamping and forming a single linear piece into the respective configurations shown. This method of manufacture allows the intricate structure of the combined leg and stop member assemblies 120, 320 and 420 respectively, to be formed from the first end of the planar elongated linear segment of each of these bracket members.

Figure 10:
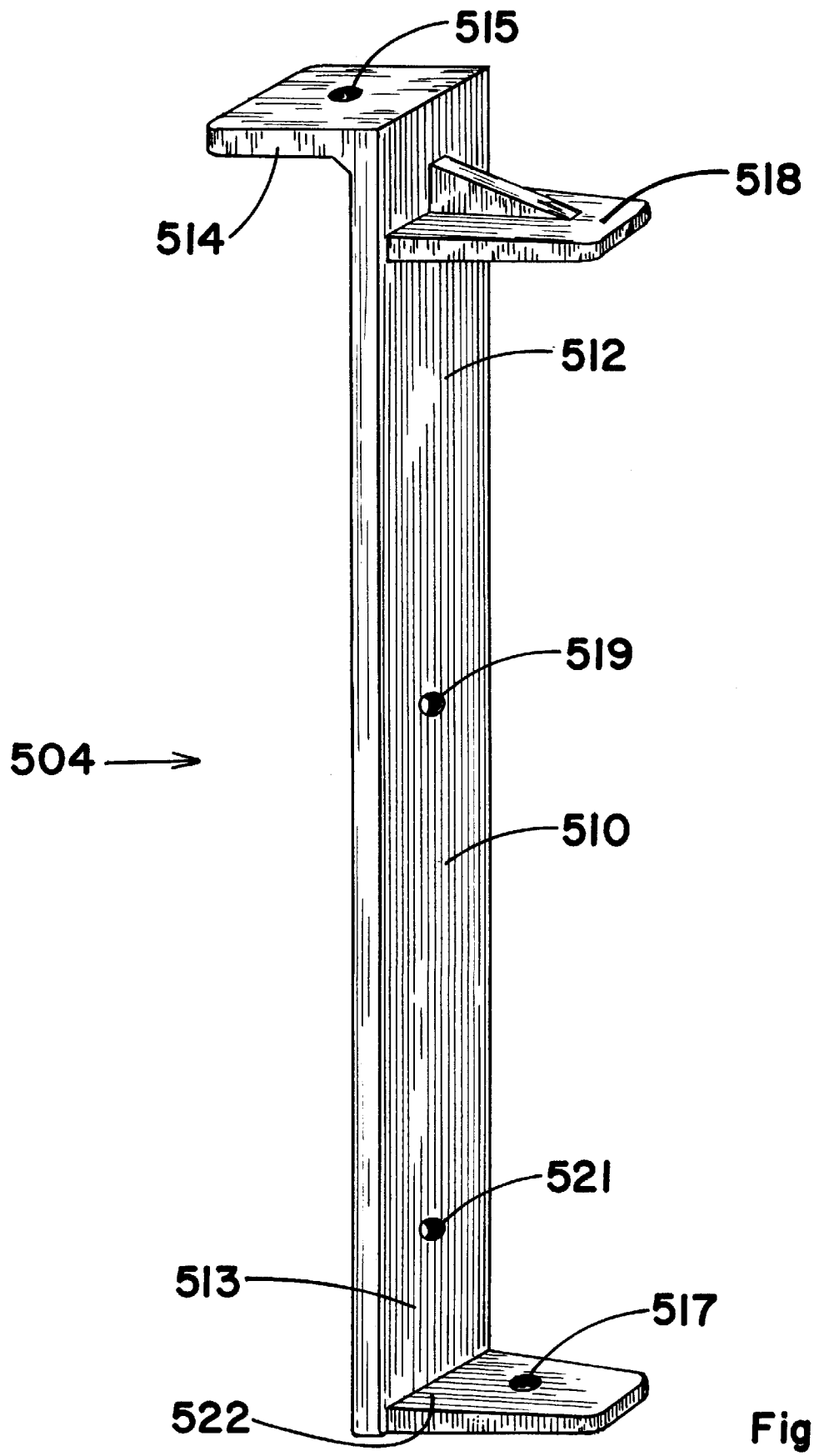
FIG. 10 is a perspective view of another alternate embodiment of the invention which may be molded from plastic, this embodiment being also shown in design Pat. No. Des. 405,348.

FIG. 10 illustrates a duct hanging member 504, which may be molded of polymeric resin or plastic material. The hanging member 504 comprises an elongated linear segment 510 with a first leg section 514 perpendicularly formed at one end and a second leg section 522 perpendicularly formed at an opposite end. The two leg sections 514, 522 are oriented in opposition to each other, and each contains a centrally located aperture 515, 517 for a fastener. Adjacent the first leg section 514 is a stop member 518 oriented essentially perpendicular to the elongated linear segment 510 and in opposition to the first leg section 514. The stop member 518 resists the upward displacement of the HVAC duct 2 when a fastener, such as a sheet metal screw, is driven into the bottom of the HVAC duct 2 after passing through the preformed second aperture 517. Additionally, third and fourth apertures 519 and 521 are formed in the elongated leg section segment 510 between the stop member 518 and the second leg section 522 to provide openings for additional fasteners, such as sheet metal screws, to fasten the duct hanging bracket member 504 to the HVAC duct 2. The plastic composition of this bracket member 504 provides for light weight with ease in handling and installation without concern for cuts and abrasions that can occur when using brackets made of sheet metal.

While the invention has been particularly shown and described with reference to preferred embodiments thereof, it will be understood by those skilled in the art that various changes in form and details may be made therein without departing from the spirit and scope of the invention.

What is claimed is:

1. A duct hanging bracket member for supporting a duct member, said bracket member comprising:
    (a) a generally planar elongated linear segment with first and second ends,
    (b) a first leg section positioned at said linear segment first end and disposed essentially perpendicular thereto with an aperture centrally positioned there through, and
    (c) a second leg section positioned at said linear segment second end and disposed essentially perpendicular thereto and in opposition to said first leg section, said second leg section with an aperture centrally positioned there through, said first leg section aperture and said second leg section aperture positioned on opposite sides of the planar elongated linear segment, whereby said bracket member is secured to a support surface with a fastener positioned in said first leg section aperture, and a duct member positioned adjacent said elongated linear segment is supported and secured to said second leg section with a fastener positioned in said second leg section aperture.

2. The duct hanging bracket member according to claim 1, further comprising;
    (d) an aperture in said generally planar elongated linear segment sized to accept a fastener to further secure the duct member to said bracket member.

3. A duct hanging bracket member for supporting a duct member, said bracket member comprising:
    (a) a generally planar elongated linear segment with first and second ends;
    (b) a first leg section positioned at said linear segment first end and disposed essentially perpendicular thereto with an aperture centrally positioned there through,
    (c) a second leg section positioned at said linear segment second end and disposed essentially perpendicular thereto and in opposition to said first leg section, said second leg section with an aperture centrally positioned there through, said first leg section aperture and said second leg section aperture positioned on opposite sides of the planar elongated linear segment; and
    (d) a stop means secured to said linear segment first end and disposed essentially perpendicular there to and in opposition to said first leg section, said stop means oriented parallel to said second leg section and in spaced apart relation therefrom, said stop means and second leg section spaced to accept a duct member there between, whereby said bracket member is secured to a support surface with a fastener positioned in said first leg section aperture, and a duct member positioned adjacent said elongated linear segment is supported and secured by said stop means and said second leg section with a fastener positioned in said second leg section aperture.

4. The duct hanging bracket member according to claim 3, further comprising;
    (e) an aperture in said generally planar elongated linear segment sized to accept a fastener to further secure the duct member to said bracket member.

5. The duct hanging bracket member according to claim 3, wherein said bracket member is fabricated from sheet metal and said stop means comprises a tab member punched from said planar elongated linear segment and positioned perpendicular thereto.

6. The duct hanging bracket member according to claim 3, wherein said stop means comprises a stop member portion of said planar elongated linear segment first end adjacent said first leg section, with a first stop member section extending essentially parallel to said second leg section and a second stop member section connecting said first stop member section with said first leg section.

7. The duct hanging bracket member according to claim 6, wherein said first and second stop member sections comprise an L-shaped portion of said planar elongated linear segment first end.

8. The duct hanging bracket member according to claim 6, wherein said first and second stop member sections comprise a V-shaped portion of said planar elongated linear segment first end.

9. The duct hanging bracket member according to claim 6, wherein said first and second stop member sections comprise a U-shaped portion of said planar elongated linear segment first end.

10. A duct hanging bracket member for supporting a duct member, said bracket member comprising:
    (a) a generally planar elongated linear segment with first and second ends;
    (b) a first leg section positioned at said linear segment first end and disposed essentially perpendicular thereto with an aperture centrally positioned there through;
    (c) a second leg section positioned at said linear segment second end and disposed essentially perpendicular thereto and in opposition to said first leg section, said second leg section with an aperture centrally positioned there through, said first leg section aperture and said second leg section aperture positioned on opposite sides of the planar elongated linear segment;
    (d) a stop means secured to said linear segment first end and disposed essentially perpendicular there to and in opposition to said first leg section, said stop means oriented parallel to said second leg section and in spaced apart relation therefrom, said stop means and second leg section spaced to accept a duct member there between, whereby said bracket member is secured to a support surface with a fastener positioned in said first leg section aperture, and a duct member positioned adjacent said elongated linear segment is supported and secured by said stop means and said second leg section with a fastener positioned in said second leg section aperture; and
    (e) an aperture in said generally planar elongated linear segment sized to accept a fastener to further secure the duct member to said bracket member.

11. The duct hanging bracket member according to claim 10, wherein said bracket member is fabricated from sheet metal and said stop means comprises a tab member punched from said planar elongated linear segment and positioned perpendicular thereto.

12. The duct hanging bracket member according to claim 10, wherein said stop means comprises a stop member portion of said planar elongated linear segment first end adjacent said first leg section, with a first stop member section extending essentially parallel to said second leg section and a second stop member section connecting said first stop member section with said first leg section.

13. The duct hanging bracket member according to claim 12, wherein said first and second stop member sections comprise an L-shaped portion of said planar elongated linear segment first end.

14. The duct hanging bracket member according to claim 12, wherein said first and second stop member sections comprise a V-shaped portion of said planar elongated linear segment first end.

15. The duct hanging bracket member according to claim 12, wherein said first and second stop member sections comprise a U-shaped portion of said planar elongated linear segment first end.

* * * * *